Feb. 1, 1966   F. J. VESKRNA   3,231,973
SELECTIVE-MULTIPLE-ACTION SLICER
Filed Jan. 27, 1964
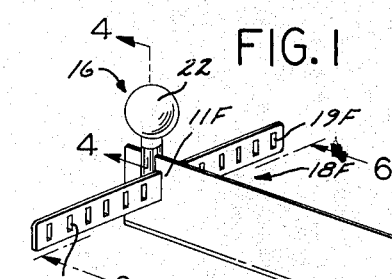
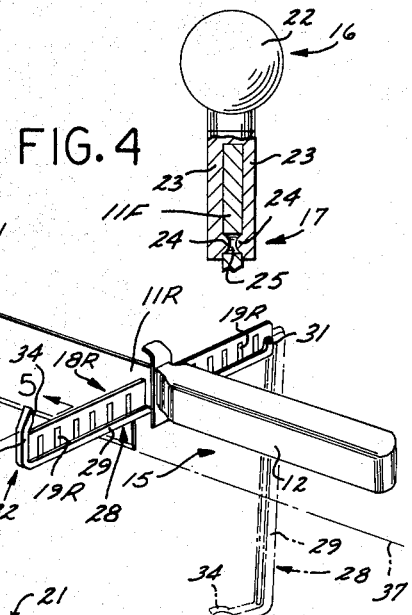
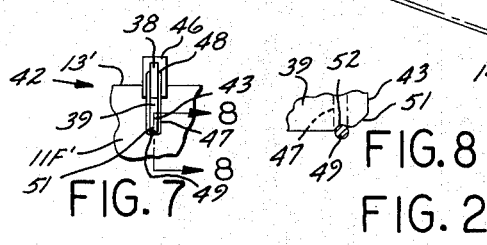
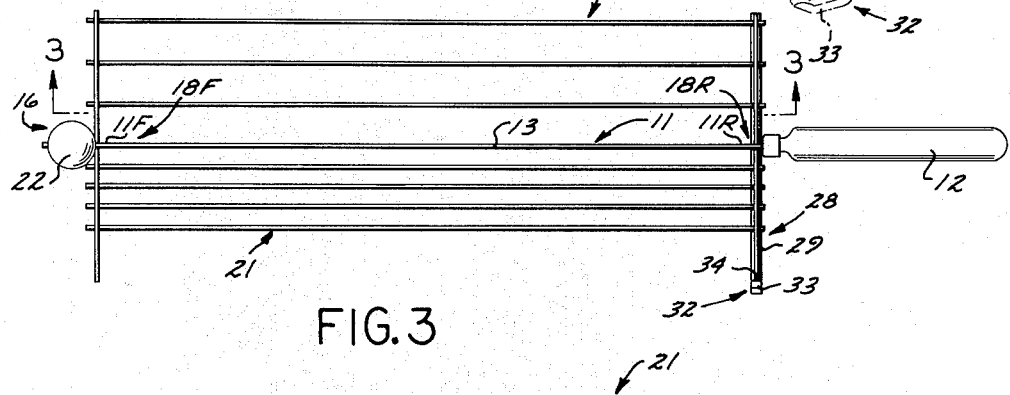
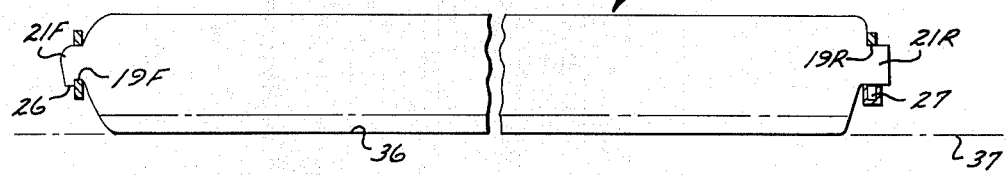
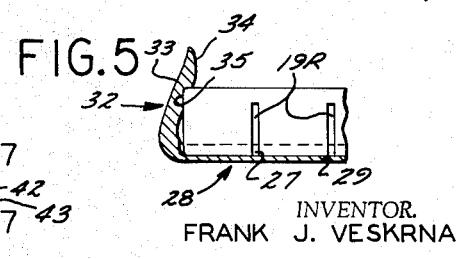
INVENTOR.
FRANK J. VESKRNA

United States Patent Office 3,231,973
Patented Feb. 1, 1966

3,231,973
SELECTIVE-MULTIPLE-ACTION SLICER
Frank J. Veskrna, 5110 Garden Grove, Tarzana, Calif.
Filed Jan. 27, 1964, Ser. No. 340,290
4 Claims. (Cl. 30—305)

Generally speaking, the present invention relates to the food slicing art and, more particularly, pertains to a slicer and/or dicer which is of a selective type adapted to be operated with various different selected numbers of slicing blades and with the blades in selected relative lateral spacings with respect to each other. This makes it possible to slice and/or dice food in various sizes.

In other words, with the novel apparatus of the present invention, one may use only one knife or a plurality of knives as desired and may adjust the spacing therebetween so as to vary the thickness of the food slices produced as a result of the slicing operation or so as to vary the size of pieces of food produced by a dicing operation resulting from first slicing the food in one direction and then rotating the apparatus 90 degrees and slicing in the other direction whereby to cross-cut the longitudinal slices previously produced.

Also, the slicing blades may be interchanged and varied as to style, thickness, or configuration whereby to facilitate various different types of food slicing and/or dicing operations.

The above is all made possible by reason of the fact that the apparatus comprises a holder which can very readily firmly mount a variable number of auxiliary knife blades in addition to a longitudinal main knife blade and in a manner which allows quick and easy disengagement and removal of any of said auxiliary knife blades as desired and also which allows the replacement thereof when desired either with the same auxiliary knife blades or with replacement auxiliary knife blades of any desired style and configuration as required by various food slicing and/or dicing operations.

The invention also provides a very positive locking arrangement for holding the auxiliary knife blades in mounted relationship until it is desired to remove same, usually for washing or storage purposes.

I am aware of the fact that various slicing and dicing devices have been invented and developed heretofore. However, most of such devices are of a relatively non-variable nature having a plurality of cutting elements in a relatively predetermined, positionally movable relationship with respect to a cutting board or the like, and usually it is quite difficult to modify the number of cutting blades and/or the spacing thereof in such prior art devices. Certainly none of such prior art devices known to me is capable of extreme variability as to number of knife blades and as to the spacing therebetween, and in an apparatus of such an extremely simple and readily adjustable nature as the present invention which, for these reasons, provides a highly advantageous and widely adaptable slicer and/or dicer capable of use under a great variety of circumstances and conditions of use.

With the above points in mind, it is an object of the present invention to provide a novel selective-multiple-action slicer embodying the features and/or advantages referred to herein, either generically and/or specifically, and either individually or in combination, and which is of relatively simple, inexpensive construction suitable for mass manufacture at low cost and which is extremely easy to operate in a wide variety of different arrangements for corresponding different food chopping usages, such as to facilitate the widespread dissemination and use of the apparatus.

Further objects are implicit in the detailed description which follows hereinafter (which is to be considered as exemplary of, but not specifically limiting, the present invention) and said objects will be apparent to persons skilled in the art after a careful study of the detailed description which follows hereinafter.

For the purpose of clarifying the nature of the present invention, two exemplary embodiments of the invention are illustrated in the hereinbelow-described figures of the accompanying single drawing sheet and are described in detail hereinafter.

FIG. 1 is a perspective view of one exemplary embodiment of the apparatus of the present invention prior to mounting engagement therewith of any of the plurality of auxiliary longitudinal knife blade members, such as the exemplary ones shown in top plan in FIG. 2, for example.

FIG. 2 is a top plan view of the apparatus of FIG. 1 after mounting engagement therewith of seven of the auxiliary knife blade members, three of which are shown on one side of the main longitudinal knife blade member in one rather wide type of lateral spacing therebetween, and another four of which are shown on the other side of said main knife blade member in a substantially narrower lateral spacing thereof. It should be understood that this actually is a composite view since normally all auxiliary knife blade members received and mounted by the apparatus would be in the same lateral spacings. In other words, the wide type spacing shown on one side of the main knife blade member in FIG. 2 is to illustrate this type of spacing, while the narrow type of spacing shown on the other side of the main knife blade member in FIG. 2 is to illustrate this narrow type of blade spacings. FIG. 2 is not intended to indicate that the apparatus is normally used with two different types of spacing at the same time, although the invention is not specifically limited to a single type of spacing during any given usage thereof.

FIG. 3 is an enlarged fragmentary side view taken in the direction of the arrows 3—3 of FIG. 2 with a center portion of the auxiliary knife blade member shown in FIG. 3 being broken away for space conservation reasons.

FIG. 4 is an enlarged fragmentary view, partly in elevation and partly in section, taken in the direction of the arrows 4—4 of FIG. 1 and clearly illustrates one exemplary type of auxiliary handle means carried at the opposite end of the longitudinal main knife blade member from the main handle means at the near end thereof as shown in FIG. 1. Furthermore, in the exemplary form illustrated in FIG. 4 in detail, said auxiliary handle means is of a controllably removable type, although the invention is not specifically so limited.

FIG. 5 is an enlarged fragmentary view taken in the direction of the arrows 5—5 of FIG. 1 and clearly illustrates in fragmentary form the detail of the fastener or locking means for fastening and locking the retention means which holds all of the near engagement projection means of the auxiliary knife blade members, such as the one shown at the right end of the auxiliary knife blade member of FIG. 3, in retained relationship with respect to the corresponding near auxiliary knife blade holding means, which comprises the one adjacent to the near longitudinal handle means of FIG. 1.

FIG. 6 is a fragmentary view of a slightly modified form of the invention taken in a direction such as that indicated by the broken line arrows 6—6 of FIG. 1, although it should be clearly understood that FIG. 6 is not actually such a view of FIG. 1, since FIG. 1 illustrates the first form of the invention and FIG. 6 illustrates a modified form thereof. This view illustrates the fact that the modified form of the forward knife blade holding means is controllably removably carried by a forward portion of the main knife blade member and is provided with locking means for firmly locking it in symmetrically transversely disposed relationship with respect to said forward portion of said main knife blade member and for controllably unlocking same for removal of said complete forward holding means from said main knife blade member when desired.

FIG. 7 is a fragmentary view taken in the direction of the arrows 7—7 of FIG. 6.

FIG. 8 is a further fragmentary partially sectional view illustrating the locking engagement of the locking means of the modified removable forward knife blade holder means of FIGS. 6–8, and is taken in the direction of the arrows 8—8 of FIG. 7.

Generally speaking, the selective-multiple-action slicer and/or dicer of the present invention comprises a longitudinal main knife blade member provided with handle means and auxiliary knife-blade-holding means adapted to receive and hold one or more auxiliary knife blade members in any of a plurality of selected laterally spaced parallel relationships with respect to said main knife member so as to provide a slicer and/or dicer structure capable of virtually any desired type of slicing and/or dicing action.

In other words, the apparatus is variable as to the number of blades and the spacing therebetween. In the exemplary first form of the invention illustrated, said longitudinal main knife blade is indicated generally at 11 and has a rear end 11R and a front end 11F.

In the exemplary first form of the invention illustrated, the above-mentioned handle means comprises a main handle 12 at the rear end thereof substantially longitudinally aligned with the back edge 13 of the main knife blade member 11 and upwardly offset from, and spaced from, the longitudinal bottom sharpened cutting edge 14 of said main knife blade member 11 to a degree sufficient to provide a finger clearance region such as is indicated generally at 15 in FIG. 1.

In the exemplary first form of the invention illustrated the longitudinal main knife blade member 11 is also provided with auxiliary handle means, such as is generally indicated at 16, which is mounted adjacent to the forward or front end 11F of said main knife blade member 11 in a manner extending upwardly therefrom for convenient manual grasping of same when the entire device is used for food slicing and/or dicing purposes as will be explained in greater detail hereinafter.

Also at this point it should be noted that, in the exemplary first form of the invention illustrated, the above-mentioned auxiliary handle means, indicated generally at 16, is of a controllably removable type which can be controllably engaged with respect to the forward or front end 11F of the main knife blade member 11 and can be controllably disengaged and removed therefrom when desired. The engagement means which makes this possible is generally designated by the reference numeral 17 in FIG. 4 and will be described in detail hereinafter. However, it should be clearly noted at this point that the invention is not specifically limited to this particular type of controllably removable engagement means and, indeed, in certain forms of the invention the auxiliary handle means 16 may be permanently mounted with respect to the front or forward end 11F of the main knife blade member 11.

In the exemplary first form of the invention illustrated, the hereinbefore-mentioned auxiliary-knife-blade-holding means comprises a pair of longitudinally spaced, similarly laterally directed, substantially parallel, auxiliary knife blade holding means, such as the forward or front one indicated generally at 18F and the rear one indicated generally at 18R.

In the exemplary first form of the invention illustrated, the forward auxiliary-knife-blade-holding means 18F is permanently carried by the forward or front end 11F of the main knife blade member although, as will be pointed out in great detail hereinafter, in certain forms of the invention it may be removably carried by said forward end 11F of said main knife blade member 11.

In the exemplary first form of the invention illustrated, the rear auxiliary-knife-blade-holding means 18R is shown as being permanently attached to the rear end 11R of the main knife blade member 11. However, as pointed out hereinabove in connection with the front auxiliary-knife-blade-holding means 18F, the rear one 18R may also be removably mounted with respect to the rear end 11R of the main knife blade member 11 in certain forms of the invention.

In the exemplary first form of the invention illustrated, each of the front and rear auxiliary-knife-blade-holding means has a plurality of knife blade receiving and holding apertured portions 19F in the case of the front holding means 18F, and 19R in the case of the rear holding means 18R, with the front and rear apertured holding portions 19F and 19R being similarly laterally spaced and with longitudinal pairs thereof being longitudinally aligned with each other for removably receiving, holding and engaging engagement projection means, such as shown at 21F and 21R carried at the front and rear ends, respectively, of one or more auxiliary longitudinal knife blade members, generally designated by the reference numeral 21, whereby to mount said one or more auxiliary knife blade members 21 in parallel laterally spaced relationship relative to said main knife blade member 11.

The arrangement described above is such that a single auxiliary knife blade member 21 may be mounted on either side of the main knife blade member 11 at any of a plurality of laterally selected locations corresponding to any longitudinally aligned pair of said apertured holding portions 19F and 19R. I should also be noted that any desired number of said auxiliary knife blade members 21 may be similarly mounted at different selected laterally spaced locations on either side of, or on both sides of, the main knife blade member 11 so as to provide any desired number (within the limits determined by the apparatus) of auxiliary knife blade members 21 in addition to the main knife blade member 11 and with any selected lateral spacings therebetween so as to provide virtually any desired type of multiple slicing and/or dicing action when the main handle member 12 and the auxiliary handle member 16 are grasped and the assembled apparatus is moved downwardly against an underlying horizontal surface, such as a cutting board or the like (not shown) upon which any food objects which are to be cut (not shown) are placed.

The cutting action may first be in one direction to any desired extent and may then be in another direction, such as perpendicular to the first direction, if desired, or angularly related to the first direction, if desired, whereby to produce virtually any desired type of slicing and/or dicing action, as determined by the number of auxiliary blade members 21 held by the holding means 18F and 18R and as additionally determined by the lateral spacings therebetween.

In the exemplary first form of the invention illustrated, the hereinbefore-mentioned auxiliary handle means 16 comprises an upwardly directed manually graspable member taking the form of a spherically shaped knob 22 provided with a downwardly directed bifurcated split engagement means 17 including the laterally spaced engagement members 23, each of which has an inwardly directed projection element 24 adapted to be received in a corresponding recess or detent 25 formed in opposed surfaces of the forward end 11F of the main knife blade member 11. This makes it possible to resiliently engage said bifurcated split engagement means 17 with respect to said forward edge end 11F of the main knife blade member 11 in a relationship such as is clearly shown in FIGS. 1, 2, and 4, and also makes it possible to remove same when desired.

The removal of the auxiliary handle means 16 may facilitate cleaning and/or storage of the device, or it may be removed for other purposes when desired. However, as pointed out hereinbefore, the removable engagement means 17 may take other forms and, in certain forms of the invention, the auxiliary handle means 16 may be permanently attached to the forward end 11F of the main knife blade member 11.

Each of the hereinbefore-mentioned forward or front engaging or engagement projections 21F of the auxiliary knife blade members 21 is of a type having a downwardly projecting hook portion 26 which is adapted for longitudinal entry of a special kind (described hereinafter) into, and in engagement with, the corresponding rectangular slots comprising the front holding apertured portions 19F of the front holding means 18F.

The above-mentioned longitudinal entry of a special kind, with reference to the engagement of the forward engagement projection 21F of any of the auxiliary longitudinal knife blades 11 with respect to the corresponding slotted apertured holding portion 19F, requires that the auxiliary knife blade member 21 be placed in a position such that the rear end engagement projection 21R is substantially below the front end engagement projection 21F thereof in a manner which causes the hook portion 26 to be downwardly and somewhat forwardly directed. Then said downwardly and somewhat forwardly directed hook portion 26 of the front engagement projection 21F may be longitudinally entered into the corresponding slotted apertured holding portion 19F of the front holding means 18F, and then the rear engagement projection 21R of said auxiliary knife blade member 21 can be moved upwardly in a swinging manner so as to bring about a swinging entry into the open lower edge 27 of the corresponding one of the slots comprising each of the rear apertured holding portions 19R of the rear holding means 18R. Of course, this is only possible when the pivotally mounted retention means, indicated generally at 28, is pivotally swung into open relationship as is shown in phantom in FIG. 1, since this effectively opens the bottom of each of the rear engagement slots 19R of the rear holding means 18R.

As soon as all of the auxiliary knife blade members 21 which are to be mounted are so engaged with respect to the corresponding front and rear longitudinally aligned pairs of slotted aperture engagement portions 19F and 19R, the pivotally mounted retention means 28, which comprises the transverse upwardly grooved bar member 29, which is pivoted at 31, is swung from the broken line position of FIG. 1 into the solid line position shown in full in FIG. 1 and shown fragmentarily in FIGS. 3 and 5, in which retaining relationship it is effectively locked by resilient snap action fastener or locking means, generally indicated at 32 and best shown in FIG. 5. This firmly locks the front and rear engagement projections 21F and 21R, respectively, of each of the auxiliary knife blade members 21 in mounted relationship relative to the front and rear holding means 18F and 18R, respectively. This is shown with respect to one blade in FIG. 3 and is shown with respect to a plurality of differently spaced blades in FIG. 2.

It should be noted that the exemplary fastening or locking means 32 for the pivotally mounted retention means 28 merely comprises an upwardly and inwardly angularly directed resilient finger 33 having an outwardly curved or cammed surface 34 adapted to slidably cooperate with the corresponding end portion 35 of the rear holding means 18R for over-center, snap-action retaining engagement therewith when in fully closed relationship in the manner clearly shown in FIGS. 1 and 5. However, it will be understood that the upwardly projecting portion 34 thereof may be resiliently sprung outwardly sufficient to allow same to slide over the end 35 of the rear holding means 18R to allow the retention means 28 to be pivotally swung into an open position, such as is shown in phantom in FIG. 1, when any one of the auxiliary knife blade members 21 is to be removed from the two holder means 18F and 18R or when any one of said auxiliary knife blade members 21 is to be mounted with respect to said front and rear holding means 18F and 18R as pointed out above.

While the fastening and locking means 32 comprises a very simple and highly advantageous type of structure for the purposes outlined above, it should be noted that the invention is not specifically limited thereto, but that various other functionally equivalent locking or fastening means may be employed in lieu thereof, if desired.

It should be noted that when the auxiliary knife blade members 21 (in any desired number) are mounted with respect to the front and rear holding means 18F and 18R in the manner described above, each of said auxiliary knife blade members 21 has a longitudinal cutting edge 36 at the bottom thereof which lies in a cutting plane common to all of the other cutting edges 36 of all of the other auxiliary knife blade members 21 and also common to the cutting edge 14 of the main knife blade member 11, said cutting plane being indicated in phantom at 37 in FIG. 3.

FIGS. 6–8 illustrate a slight modification of the front holding means designated by the reference numeral 18F in the first form of the invention and designated by the reference numeral 18F' in this modification of the invention. The modified front holding means 18F' comprises a removable holding means which can be removably carried by a forward portion 11F' of the main knife blade member (similar to that shown at 11) in the first form of the invention) and which can be removed therefrom when desired.

It will be noted that, in the exemplary form of this modification illustrated in FIGS. 6–8, the modified holding means 18F' comprises an upper laterally directed member 38 and a lower laterally directed member 39 pivotally interconnected by pivot pin means 41 at one end thereof and provided with locking means, indicated generally at 42, at the other end thereof. The upper and lower transverse members 38 and 39 together define each of the apertured holding portions 19F' when in the closed mounted locked relationship clearly shown in FIG. 6.

This modified holding means 18F' is mounted with respect to the main blade front end portion 11F' by having the upper and lower portions 38 and 39 in open relationship so that the right end 43 of the lower transverse member 39 can be laterally slidably inserted through a rectangular transverse aperture 44 in the main knife blade member front end 11F' until the stop member 45 strikes the side thereof as is clearly shown in FIG. 6. Then the upper member 38 is pivotally swung around the pivot pin 41 into a closed relationship such as is shown in FIG. 6 where the other stop member 46 moves into abutment with the other side of the top edge 13' of the main blade front end 11F' so as to firmly lock the entire modified front holding means 18F' against any lateral movement relative to the main blade member's front end 11F'. This is clearly shown in FIG. 6. Then the locking means 42 is effectively moved into locked relationship whereby to lock the right ends of the upper and lower members 38 and 39 together in the relationship shown in FIG. 6. This provides a structure functionally equivalent to the front holding means 18F of the first form of the invention and no description of the mounting cooperation thereof with respect to the auxiliary blade members is thought necessary.

The exemplary type of locking means 42 illustrated in FIGS. 6–8 comprises a ring 47 which is pivotally mounted at 48 at the right end of the upper member 38 and which has a lower end portion 49 adapted to slide over the angularly cammed lower edge portion 51 of the right end of the lower transverse member 39 and into a locking groove 52 whereby to positively lock the right ends of the upper and lower members 38 and 39 together and yet to make it possible to digitally apply force to the lower end 49 of the locking ring 47 in a counterclockwise direction as viewed in FIG. 6 so as to effectively disengage same from the locking groove 52 whereby to effectively unlock the locking means 42 and allow the right ends of the upper and lower transverse members 38 and 39 to be pivotally separated by relative pivotal movement around the pivot pin means 41 into an open relationship so that the lower transverse member 39 can be slidably removed from the aperture 44 in the main knife blade's front end portion 11F′ whenever desired. This may be desirable to facilitate storage of the apparatus or for cleaning purposes or where the front end of the main knife blade member is to be used individually for general cutting, slicing, or chopping purposes.

It should be understood that the figures and the specific description thereof set forth in this application are for the purpose of illustrating the present invention and are not to be construed as limiting the present invention to the precise and detailed specific structure shown in the figures and specifically described hereinbefore. Rather, the real invention is intended to include substantially equivalent constructions embodying the basic teachings and inventive concept of the present invention.

I claim:

1. A selective multiple action slicer comprising: a longitudinal main knife blade member provided with handle means and a pair of longitudinally spaced similarly laterally directed, parallel auxiliary-knife-blade-holding means, each having a plurality of knife blade receiving and holding apertured portions similarly laterally spaced and longitudinally aligned with each other; at least one auxiliary longitudinal knife blade member having engagement projection means at opposite ends thereof adapted to be removably received, engaged and held by corresponding longitudinally aligned pairs of said knife blade receiving and holding apertured portions so as to mount said auxiliary knife blade member parallel to said main knife blade member and laterally spaced therefrom by a desired and controllably selectively changeable distance, one of said holding means being provided with pivotally mounted retention means cooperable for movement between an open position, allowing the removal of each auxiliary knife blade member from both of said holding means, and a closed retaining position positively retaining each auxiliary knife blade member in mounted relationship relative to said longitudinally spaced holding means, said pivotally mounted retention means being provided with integral locking means for fastening and locking said retention means in said retaining relationship until manually unfastened and unlocked for removal of any auxiliary knife blade member from said longitudinally spaced holding means, said retention means cooperating with said apertured holding portions in a manner such, when open, as to allow vertical swinging entry of the corresponding auxiliary knife blade engagement projection of each auxiliary knife blade member thereinto and to allow vertical swinging egress of said corresponding auxiliary knife blade engagement projection therefrom, the apertured holding portions of the other one of said holding means being such as to require end entry of the oppositely longitudinally positioned engagement projection of each such auxiliary knife blade member thereinto, by longitudinal movement simultaneously with said vertical swinging entry of said first-mentioned engagement projection into said holding means having said pivotally mounted retention means, and being such as to re require substantially the reverse movement of said second-mentioned engagement projection for removal thereof from said second-mentioned apertured holding portions of said other one of said holding means; said main knife blade member having a longitudinal bottom cutting edge; said handle means comprising a main longitudinal handle substantially alignedly carried at the rear end of said main knife blade member and extending rearwardly therefrom and together therewith effectively comprising a structure simulating a conventional knife, said main longitudinal handle being in a position vertically spaced above a horizontal common cutting plane coincident with said bottom cutting edge of said main knife blade member, thereby providing a finger clearance region underneath said main longitudinal handle and above the level of said bottom cutting edge of said main knife blade member, each auxiliary knife blade member adapted to be held by said auxiliary-knife-blade-holding means being of a type having a longitudinal cutting edge at the bottom thereof extending downwardly to said common horizontal cutting plane in which the bottom cutting edge of said main knife blade member also lies, said handle means also comprising an auxiliary handle means positioned adjacent to the other end of said main knife blade member.

2. A device as defined in claim 1, wherein said auxiliary handle means comprises a controllably removable auxiliary handle including an upwardly directed manually graspable member and a downwardly directed bifurcated split engagement means adapted to resiliently engage a forward portion of said main knife blade member.

3. A device as defined in claim 1, wherein the forward one of said holding means is removably carried by a forward portion of said main knife blade and is provided with locking means for firmly locking it in symmetrically transversely disposed relationship with respect to said forward portion of said main knife blade and for controllably unlocking same for removal from said forward portion of said main knife blade when desired.

4. A device as defined in claim 1, including a plurality of said auxiliary knife blade members, each having said engagement projection means at opposite ends thereof cooperable for removable reception and engagement by corresponding differently laterally spaced pairs of said longitudinally aligned auxiliary knife blade receiving and holding apertured portions of said auxiliary-knife-blade-holding means so as to mount each of said auxiliary knife blade members parallel to said main knife blade member and laterally spaced therefrom by a desired and different distance for each of said auxiliary knife blade members, said distance being controllably selectively changeable as desired.

References Cited by the Examiner

UNITED STATES PATENTS

| 749,357 | 1/1904 | Breitstein | 30—305 |
| 839,298 | 12/1906 | Kitterman | 214—4 X |
| 1,614,282 | 1/1927 | Cleary | 30—305 X |
| 2,661,535 | 12/1953 | Berles | 30—305 |

FOREIGN PATENTS

| 151,183 | 6/1937 | Austria. |
| 428,619 | 12/1947 | Italy. |

WILLIAM FELDMAN, *Primary Examiner.*

JAMES L. JONES, JR., *Examiner.*